Feb. 5, 1929.
W. S. NICKERSON
1,701,212
SLEIGH ATTACHMENT FOR MOTOR VEHICLES
Filed June 30, 1926      3 Sheets-Sheet 2
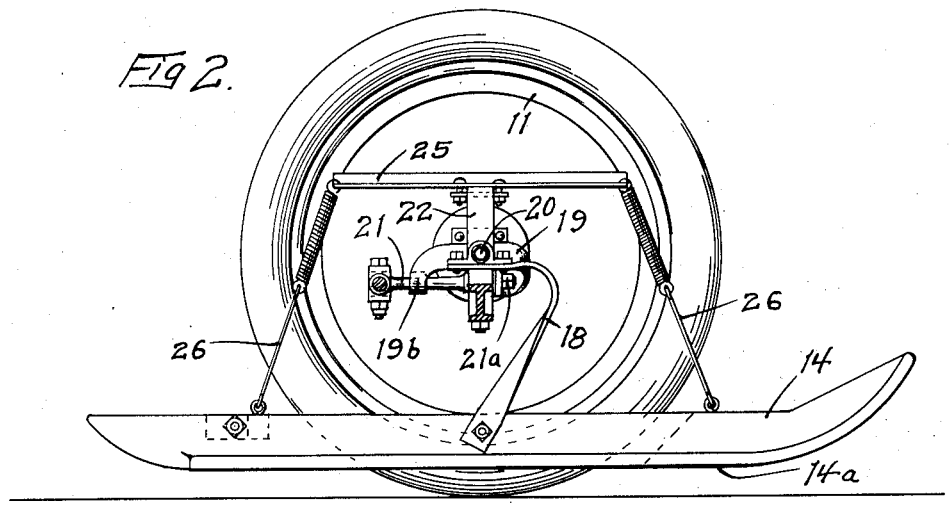
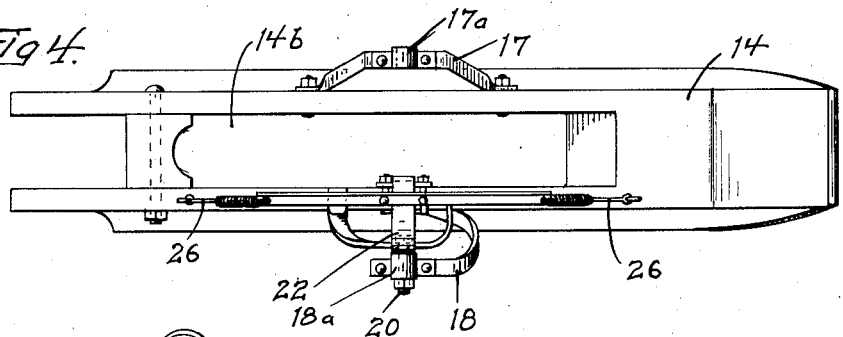
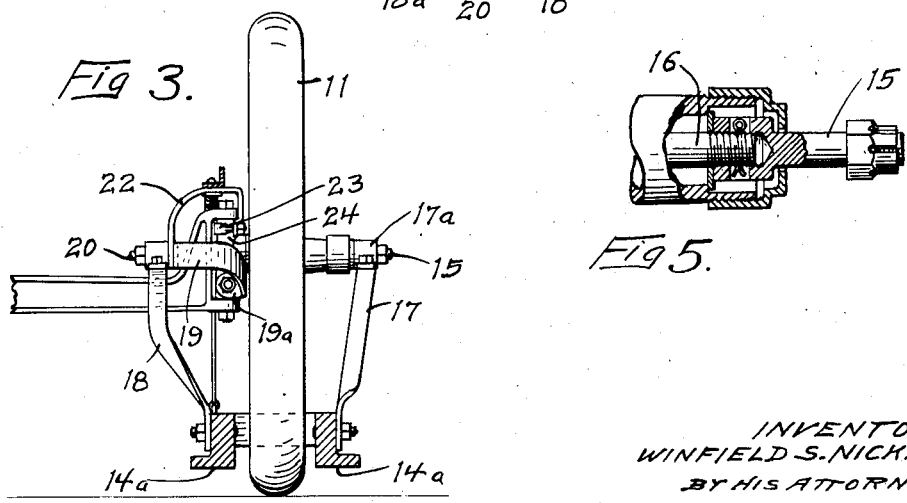
INVENTOR
WINFIELD S. NICKERSON
BY HIS ATTORNEYS Feb. 5, 1929.  1,701,212
W. S. NICKERSON
SLEIGH ATTACHMENT FOR MOTOR VEHICLES
Filed June 30, 1926   3 Sheets-Sheet 3
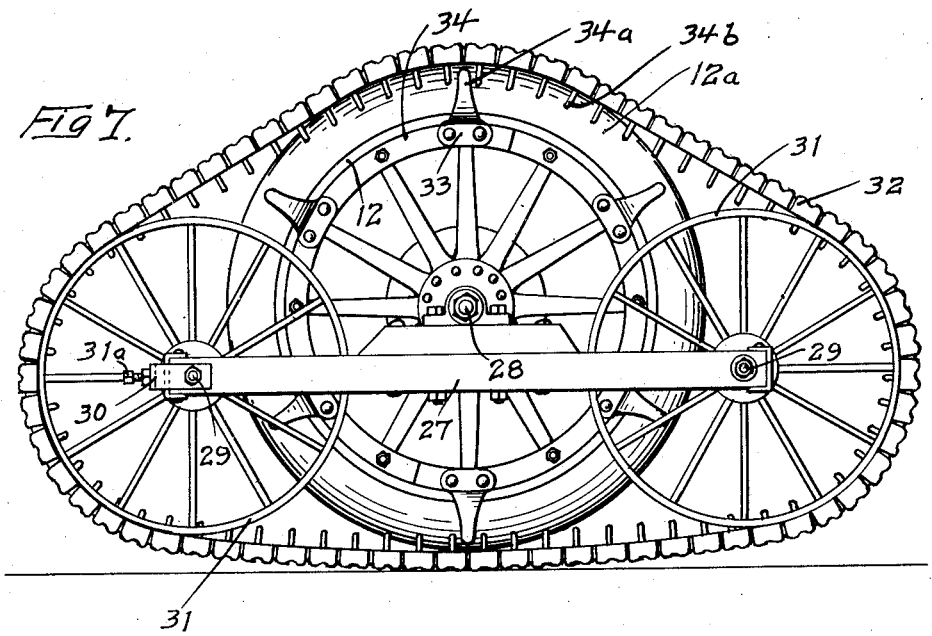
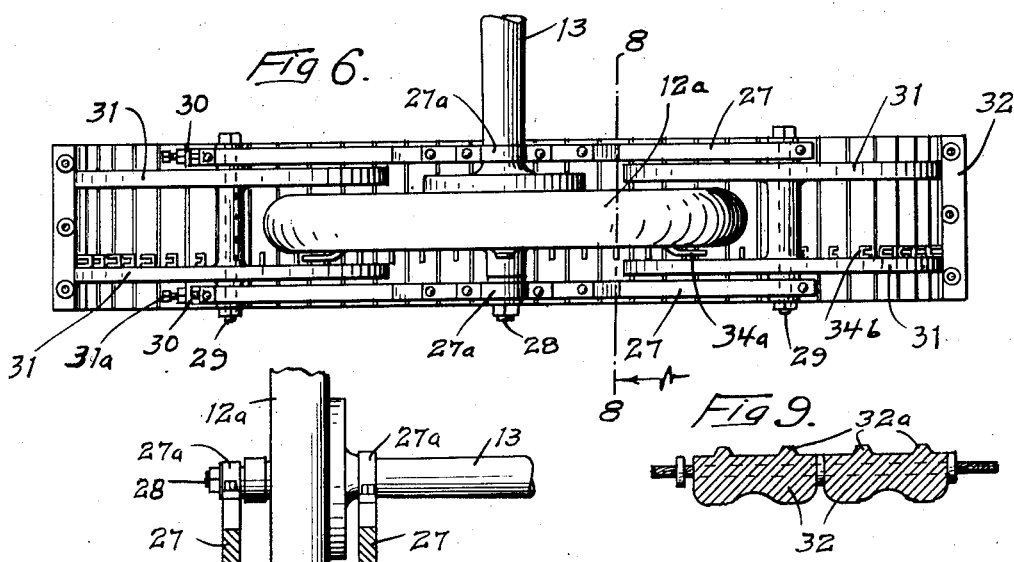
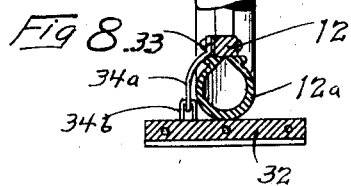
INVENTOR
WINFIELD S. NICKERSON
BY HIS ATTORNEYS Patented Feb. 5, 1929.

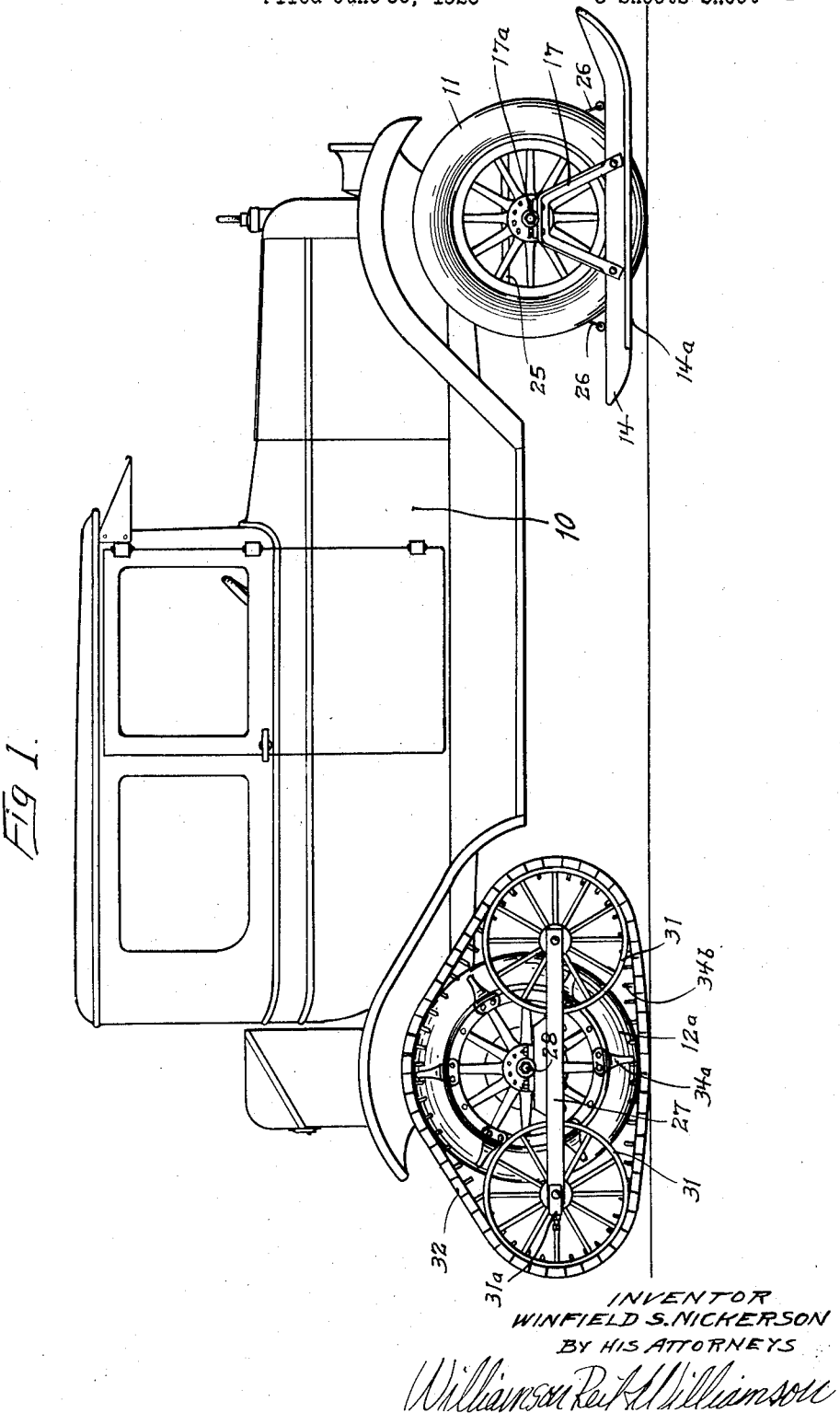

1,701,212

UNITED STATES PATENT OFFICE.

WINFIELD S. NICKERSON, OF FARIBAULT, MINNESOTA.

SLEIGH ATTACHMENT FOR MOTOR VEHICLES.

Application filed June 30, 1926. Serial No. 119,665.

This invention relates to sleigh attachments for motor vehicles, and especially to devices of this nature which may be readily installed without changing or reconstructing the motor vehicle or any of the parts thereof.

The main object of this invention is to provide a simple, comparatively inexpensive sleigh attachment for motor vehicles which will support and propel the motor vehicle over snow or other soft and slippery supporting surfaces with a high degree of efficiency and which, moreover, though installed will permit the front wheels to support the front of the vehicle as the same is driven over bare ground.

Another object is to provide in such a device runner attachments for the front wheels of a motor vehicle adapted to be swung with the steering arm and to permit the wheels to revolve through the runners.

A still further object of the invention is to provide in a sleigh attachment, propelling mechanism mounted from the rear axle of the vehicle and comprising traction belts adapted to be driven from the wheels and tire treads and extending beneath the wheels over a substantial surface.

These and other objects of the invention will be apparent from the following description made in connection with the accompanying drawings, wherein like characters refer to similar parts throughout the several views, and in which Fig. 1 is a side elevation of my attachment on a motor vehicle;

Fig. 2 is a side elevation of the runner attachment for one of the front wheels;

Fig. 3 is an end view of the same;

Fig. 4 is a plan view of the same detached;

Fig. 5 is a detail view showing the stub shaft extension on the axles.

Fig. 6 is a plan view of one of the propelling mechanisms detached;

Fig. 7 is a side elevation of the same

Fig. 8 is a cross section taken on the line 8—8 of Fig. 6, and

Fig. 9 is a detailed cross section showing the construction of the traction belt.

In the drawings, a preferred form of the invention is illustrated as applied to a Ford automobile, although of course, the attachment is capable of being utilized on all types of standard motor vehicles.

The body of the automobile is indicated by numeral 10, supported on the front and rear wheels 11 and 12, respectively.

In general, runners are provided adjacent and about the front wheels connected for turning therewith to steer the converted vehicle, while propelling and supporting mechanism is mounted on each of the rear wheels 12 supported from the rear axle housing 13 and driven from the rear wheels 12 and rear tires 12ª. The runners for the front wheels are indicated as entireties by the numeral 14, having the side supporting surfaces 14ª, and having a relatively large rectangular recess 14ᵇ centrally disposed to permit the lower portion of the front wheels 11 to work therethrough and contact the ground until the converted vehicle is propelled over a supporting surface sufficiently soft to permit the wheels to sink up to the bottom of runners 14.

My runners 14 are attached to the front wheel structure or more specifically to the spindle structure in a new and efficient manner, whereby they may be swung with the front wheels for steering.

Means are provided at both the inner and outer sides of each of the runners 14 for securing the runner for vertical swinging movement on the axis of the wheel. A short extension shaft 15 is screwed on to each of the spindles 16 in the manner shown in Fig. 5 adapted to be journaled in a split bearing 17ª formed at the top of an inverted U-shaped strap 17 having its lower ends connected to the outer side of runner 14. The inner side of runner 14 is supported from the spindle arm and spindle body. A relatively heavy member 19 formed in approximately the shape of a figure C terminates at one end in a flat inwardly projecting tongue 19ª apertured to receive the end of spindle arm 21 after the nut 21ª has been removed. Nut 21ª may be replaced to secure member 19 at one end while the opposite end of member 19 is bent in the form of a hook 19ᵇ to embrace the outer portion of spindle arm 21. It will be seen that member 19 curves about the end of the front axle and will not interfere therewith when the wheel is swung for steering. An inwardly projecting stub shaft or spindle 20 is rigidly secured centrally of member 19 and is journaled in a split bearing 18ª formed at the upper end of a goose neck strap 18 having its lower end secured to the inner side of runner 14. Member 19 is braced by means of a strap 22 secured at one end to the central portion thereof and curved upwardly and downwardly to pass around the axle end and spindle body having a clamping collar 23 attached to the opposite end and adapted to embrace the spindle body 24. A horizontally extending bar 25, which may be constructed of angle iron is rigidly secured to the top of member 22 substantially parallel with runner 14 and is connected at its front and rear ends to the ends of runner 14 by means of spring equipped rods 26. It will be seen that the stub shaft 20 carried by member 19 is axially alined with the wheel spindle 16 and, therefore, the front runners will be capable of swinging movement on substantially the axes of wheels 11, and will, moreover, be swung horizontally with the wheels for steering.

Propelling mechanism of the traction belt type is provided about the rear wheels and includes on each wheel a pair of horizontally extended beams or frame members 27, one disposed at each side of the wheel. Inner frame member 27 carries a split bearing 27$^a$ centrally disposed at its upper edge and journaled about the rear axle housing 13 adjacent one of the brake drums. A short extension shaft 28 is screwed on the end of the rear axle in the same manner as extension shaft 15 of the runner construction and is journaled in the split bearing 27$^a$ on the outer frame member. Frame members 27 are horizontally alined and have journaled therein adjacent their ends a pair of transversely disposed shafts 29, each of said shafts being disposed adjacent one side of the tire 12$^a$. Belt tighteners 30 of any suitable type are provided in connection with one of the shafts 29 mounted at the ends of frame members 27 and may be adjusted by means of set screws 31$^a$ to vary the position of the said shaft.

On each of the shafts 29 a pair of idlers 31 are mounted disposed on opposite sides of the wheel 12. An endless traction belt 32 of any suitable construction is trained about wheel 12 and the idlers 31 and is of slightly greater width than the distance between frame members 27. The lower stretch of the belt 32 extends substantially horizontally beneath the lower portion of the tire 12$^a$ furnishing a large area of traction surface. The inner side of traction belt 32 may be provided with a plurality of transverse corrugations 32$^a$ adapted to cause the tread of the tire to frictionally engage and drive the belt. Additional driving means may be provided in the form of a sprocket 33, illustrated as comprising a pair of semi-annular plates 34 secured to the bolts on wheel 12 for attaching the tire rim and having thereon outwardly projecting circumferentially spaced teeth 34$^a$ adapted to engage a plurality of teeth or bearing bosses 34$^b$ projecting inwardly from the several sections of the traction belt. These bearing bosses or teeth may be of any suitable construction and are herein illustrated as comprising staples or members driven or embedded in the several links or sections of the belt 32. It will be seen that frame members 27 will be free to swing on axle housing 13 and extension shaft 28, as is necessary when the converted vehicle is traveling on irregular ground. Traction belt 32 engages the top and bottom portions of the tread of tire 12$^a$ and is driven thereby in co-operation with the sprocket 33.

Operation.

The operation of the device is probably obvious from the foregoing description but may be briefly summarized as follows: When the device is attached to motor vehicles as shown in Fig. 1, power applied to the rear wheels will cause traction belt to be moved thereby propelling the converted vehicle forwardly and moreover, furnishing a large area of supporting surface. This propelling mechanism will obviously function efficiently, whether the vehicle is driven over bare ground, mud or sand, snow or ice. If the supporting surface is soft the front wheels will sink up to the runners 14, and will be supported thereby. It will be noticed that the supporting sides of the runners extend at each side of the front wheels. The vehicle may be steered in the usual manner, runners 14 turning with the wheels. The construction of the parts 18, 19, 20 and 22 permits runners 14 to be attached for swinging movement to the spindle body and spindle arm of the front wheels without interference with the axle ends or other parts of the motor vehicle.

The device may be attached to standard motor vehicles without altering or reorganizing any of the parts thereof.

From the foregoing description, it will be apparent that I have invented a simple but highly efficient sleigh attachment for motor vehicles, capable of supporting and propelling the motor vehicle over all conditions of snow, ice or ground.

It will of course, be understood that various changes may be made in the form, details, proportions, and arrangement of parts without departing from the scope of the invention.

What is claimed is:

1. In a sleigh attachment for motor vehicles, a runner for each of the front wheels having a bearing surface disposed on the inner side of said wheels and above the lower peripheries thereof, supporting means partially surrounding the axle ends and secured to the spindle structure of each of the front wheels, and a hanger bar swingably secured to each of said supporting means and attached to one of said runners.

2. In a sleigh attachment for motor vehicles, a runner for each of the front wheels having a central aperture through which the lower portion of the wheel is adapted to project, a hanger bar adapted to swingably support the outer side of said runner from the spindle of the wheel, a pivot member secured to the spindle arm on the inner side of said wheel, and a second hanger bar secured at its lower end to the inner side of said runner and having its upper portion journaled on said pivot member whereby the runners may be swung for steering with the front wheels.

3. In a sleigh attachment for motor vehicles, a runner for each of the front wheels having a central aperture through which the lower portion of the wheel is adapted to project, means for attaching each of said runners to said motor vehicle comprising an extension pivot adapted to be secured to the end of the wheel spindle, a hanger arm swingably connecting the outer side of said runner to said pivot, supporting means secured to the spindle structure on the inner side of the wheel and carrying a horizontal pivot member substantially alined with said first mentioned pivot member and a hanger bar swingably connecting the inner side of said runner with said pivot member.

4. The structure set forth in claim 3, said supporting means carrying a horizontal bar, and elastic means connecting the ends of said bar with the front and rear ends of said runner.

5. In combination with the spindle structure and front wheels of a motor vehicle, a sleigh attachment comprising an inwardly projecting bracket rigidly carried by the spindle body of one of the front wheels, a runner, an inwardly extending pivot member carried by said bracket and substantially alined with the spindle, and a member swivelly connecting said runner with said pivot member.

6. In a sleigh attachment for motor vehicles, a runner for each of the front wheels having a ground engaging portion disposed inwardly of its wheel, an inwardly extending bracket rigidly carried by the spindle body, an inwardly extending horizontal pivot member rigidly carried by said bracket and substantially alined with the spindle, a strap journaled at its upper end on said pivot member and secured at its lower end to said inner portion of the runner, and a second strap pivotally connected to the outer end of the spindle and secured at its lower end to the outer portion of the runner.

7. In a sleigh attachment for motor vehicles, a runner fo reach of the front wheels having ground engaging portions disposed inwardly of said wheels, an inwardly extending bracket for each of the front wheels rigidly connected to the spindle body and having a hook adapted to engage the spindle arm, an inwardly extending substantially horizontal pivot rigidly carried by said bracket, and means for swivelly connecting said runner with said pivot.

8. In a sleigh attachment for motor vehicles, a spindle body pivotally connected with one end of the front axle of a motor vehicle and mounted for oscillation on a substantially vertical axis, a horizontally and outwardly extending spindle rigidly carried by said spindle body on which one of the front wheels of said motor vehicle may be rotatably mounted, a horizontally disposed and inwardly projecting pivot member rigidly connected with said spindle body, a runner below said spindle body and a connecting member secured at its lower end to said runner and having its upper end swivelly connected with said horizontal pivot member.

9. In a sleigh attachment for motor vehicles, a spindle body, pivotally connected to the front axle of a motor vehicle and adapted to be oscillated on a substantially vertical axis, a wheel spindle projecting laterally and outwardly from said spindle body on which a vehicle wheel may be mounted for revolution, a bracket rigidly carried by said spindle body and oscillatable therewith, a substantially horizontal pivot member projecting inwardly from said bracket, a runner below said bracket and a connecting member secured at its lower end to said runner and having its upper end swivelly connected with said pivot member.

In testimony whereof I affix my signature.

WINFIELD S. NICKERSON.